United States Patent [19]

Groover

[11] Patent Number: 4,927,055

[45] Date of Patent: May 22, 1990

[54] INCREASED COLUMN/SELECTIVITY VENDER

[75] Inventor: Phillip B. Groover, Woodstock, Ga.

[73] Assignee: The Coca-Cola Company, Atlanta, Ga.

[21] Appl. No.: 370,100

[22] Filed: Jun. 21, 1989

Related U.S. Application Data

[63] Continuation of Ser. No. 68,936, Jul. 1, 1987, abandoned, which is a continuation-in-part of Ser. No. 911,152, Sep. 24, 1986, Pat. No. 4,722,455.

[51] Int. Cl.[5] .......... B65G 59/00

[52] U.S. Cl. .......... 221/67; 221/133; 221/281; 312/291

[56] References Cited

U.S. PATENT DOCUMENTS 2,276,937 3/1942 Cordova .......... 312/291 X
3,287,079 11/1966 Courson .......... 312/291
3,367,730 2/1968 Andrews et al. .......... 312/291 X
4,032,039 6/1977 Schuller .......... 221/124 X
4,320,933 3/1982 Felix et al. .......... 312/291 X
4,600,121 7/1986 Falk et al. .......... 221/133 X

FOREIGN PATENT DOCUMENTS 105600 8/1979 Japan .......... 221/281

*Primary Examiner*—Joseph J. Rolla
*Assistant Examiner*—Gregory L. Huson

[57] ABSTRACT

A space-to-sales vend rack including a plurality of adjacent vend columns having a wide range of respective storage capacities, the columns being configured for supporting products in vertical stacks therein and being arranged in groups to provide space for respective products commensurate with the anticipated sales of such products. Some of these columns are fixed within the vending machine in which certain of these columns are mounted for at least partial removal from the interior of the vending machine to provide access to all of the columns for loading them with the products to be dispensed and for maximizing the numbers of groups of columns which can be placed within a given interior space of a vending machine.

12 Claims, 7 Drawing Sheets

INCREASED COLUMN/SELECTIVITY VENDER

This application is a continuation of application Ser. No. 068,936, filed on July 1, 1987, now abandoned, and which is a continuation-in-part of application Ser. No. 911,152 of Phillip Benson Groover, filed Sept. 24, 1986, for Increased Column/Selectivity Vender, now, U.S. Pat. No. 4,722,455 issued Feb. 2, 1988.

BACKGROUND OF THE INVENTION

The present invention relates to vend racks for a vending machine that store softdrink bottles or cans and feed the same to a discharge port in the front of a vending machine in a uniform manner. More specifically, the present invention relates to vend rack mechanisms having the flexibility of storing selected numbers of vendable bottles or cans in a variety of separately accessible vend column configurations.

One of the most widely used conventional vend racks for bottles and cans in a vending machine includes a plurality of side-by-side, vertical storage columns, each of which communicates with a discharge port in the front of a vending machine. The columns are disposed in parallel relationship, and the quantity of vendable products therein is usually controlled by dimensioning the width of the columns to receive either a double row of nestable bottles or cans or a single stacked row of bottles or cans. These columns may either be one-deep, two-deep or three-deep, depending on the depth on the vending machine cabinet This conventional vend rack suffers from the disadvantage that there is little flexibility in choice of the number of vendable products that can be stored in the respective columns. Therefore, it is difficult to match product demand with storage capacity for any given column for a vending machine of this type which conventionally contains from five to nine selectable products and from seven to ten columns.

The demand for different types of products may depend on sales location or general popularity. In addition, in vending machines such as described in U.S. Pat. No. 4,380,130 to Bachmann, et al., issued Apr. 19, 1983 and assigned to the same assignee as the present invention, product sales or demand is also influenced, for example, by the unique styling of a given vending machine. For instance, if the vending machine includes the use of an enlarged primary product selection button adjacent the coin slot of the vending machine, there will be a distinct need for more flexibility in product storage and delivery from the respective chutes of a vend rack, to accomodate the vending format of that machine. The need to match product demand with storage capacity exists, however, for all machines which vend multiple products.

One attempt to provide greater column selectivity in a vender is disclosed in U.S. Pat. No. 4,245,755 to Craven et al. In Craven, some increased selectivity is achieved by a communicating slant shelf extension of a column for which the storage capacity is to be increased. However, even the Craven apparatus has limited selectivity.

SUMMARY OF THE INVENTION

Accordingly, it is a primary object of the present invention to provide vend rack configurations for a plural product vending machine having the ability to store and supply a large number of high-demand, high-selling, vendable products in one or more large-capacity vend column configurations, and to store and supply low-selling vendable products in lower capacity vend column configurations.

It is further object of the present invention to provide vend rack configurations with greater flexibility for the variation of storage capacities of different types of vendable products within a machine of the same overall storage volume as conventional machines, including a plurality of juxtaposed, vertical storage columns.

It is yet another object of the present invention to provide a vend rack structure for use in a multiple-product vending machine which facilitates matching of the capacity of respective configurations of vend columns with product demand so that the respective chutes containing the different products will theoretically become empty about the same point in time, thereby reducing the number of service calls for refilling the machine.

It is still another object of the present invention to provide a vend rack which may be easily retrofit into existing vending machines which presently utilize conventional, vertical column vend racks.

The objects of the present invention are fulfilled by providing a vend rack assembly for delivering vendable cylindrical products to a discharge port in the face of a vending machine, comprising:

a plurality of vertical columns disposed side-by-side in parallel relationship behind the face of the vending machine, the bottom of each of the columns communicating with the discharge port, the columns being of selected sizes and arranged in groups to include means for provide space for respective products commensurate with the anticipated sales of such products and including means for supporting said products in vertical stacks, some of the columns being fixed within the vending machine and certain of the columns including means mounting those certain columns for at least partial removal thereof from the interior of the vending machine to provide access to all of the columns for loading some with the products and maximizing the number of groups of columns within a given interior space of the vending machine.

The columns are collectively contained side-by-side within a substantially rectangular frame of substantially the same size as a conventional, vertical column vend rack, so it may be easily retrofit into existing vending machines. At least two rows of columns are provided with one row being movably mounted with respect to the other row.

BRIEF DESCRIPTION OF THE DRAWINGS

The objects of the present invention and the attendant advantages thereof will become more readity apparent by reference to the following drawings wherein like numerals refer to like parts and wherein.

DETAILED DESCRIPTION OF PREFERRED EMBODIMENTS

Figure 1:
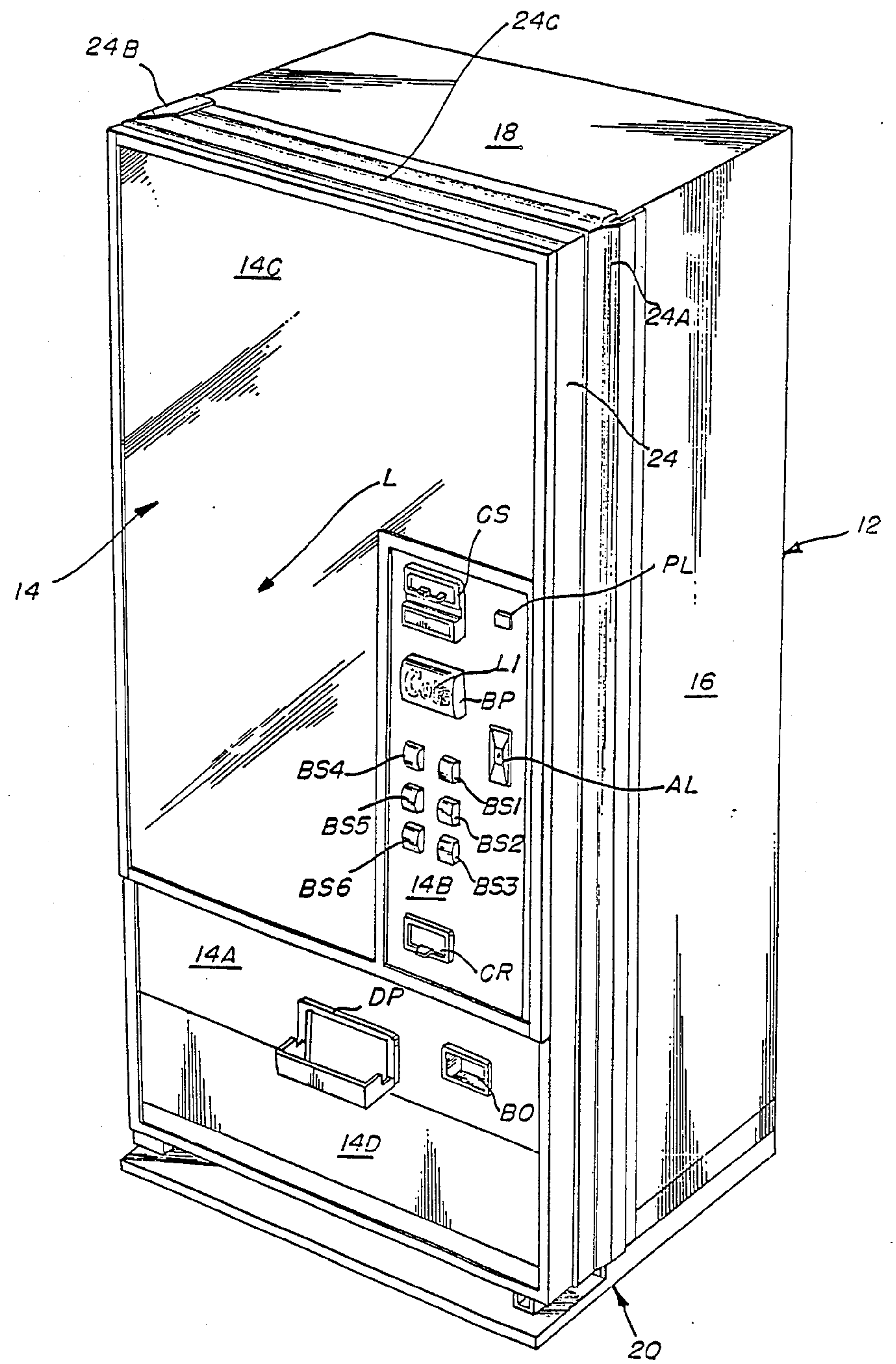
FIG. 1 (PRIOR ART)
FIG. 1 is a perspective view illustrating a vending machine of the type disclosed in U.S. Pat. No. 4,380,130, issued Apr. 19, 1983 to Bachmann, et al.

Referring to FIG. 1, an exemplary vending machine 12, incorporating a display panel 14, is illustrated as being a basically three-dimensional, rectangular structure having vertical sides 16 joining horizontal top and bottom sides 18 and 20, respectively. The structure of the vending machine 12 is completed by a flat planar rear surface and a front panel comprising a door 24 which includes the display panel 14 as the obverse face thereof.

The door 24 includes a sealing skirt 24A along one vertical edge thereof and is provided with hinges 24B at the top and bottom of the door on the opposite vertical side thereof to permit access to the interior of the vending machine 12. The bottom surface 20 of the vending machine 12 is illustrated as a load bearing pad or the like which extends outwardly from the main body portion of the machine 12 beneath the door structure 24 and display panel 14.

A further overlapped sealing skirt structure 24C extends across the top of the door 24 and cooperates with the top surface 18 of the vending machine 12.

The display panel 14 includes a first transversely disposed, opaque field section 14A located below the median height of the panel 14 in the preferred embodiment illustrated, in which a discharge port DP and a bottle opener BO are positioned side-by-side.

A second opaque field 14B comprising the selection control portion of the display panel 14 is basically rectangular in shape in the embodiment illustrated and extends vertically from the upper right-hand side of the transversely disposed first opaque field 14A.

The remaining area above the uppermost edge of the first opaque field 14A and the top of the display panel 14 is of an inverted L shape which is completely defined by a first contrasting panel 14C which is translucent and is back-lighted in a manner well known in the art, such as for example, the back-lighting arrangement illustrated in U.S. Pat. No. 4,245,730 to Bachmann, et al., for "Display panel For A Vending machine", issued Jan. 20, 1981. The first contrasting panel 14C carries a logo L which is printed out for illustration and which, in the embodiment shown, serves to suggest, in combination with the manner of positioning the logo L thereon, a container shaped such as a can of the beverage "COCA-COLA", a Registered Trademark of The Coca-cola Company of Atlanta, Ga. The logo illustrated is for "COKE" which is also a well-known Registered Trademark of that company. Thus, the first contrasting panel with its logo serves to suggest to a potential purchaser utilizing the vending machine 12, a can of "COKE".

Beneath the lower edge of the first opaque field 14A is a transversely disposed, second contrasting panel 14D which can be of various configurations or contrasting color zones, and constitutes a transversely disposed, rectangular field which, in combination with the shape (inverted L) of the first contrasting panel 14C, provides a suggestion of the letter "C", which is a an abbreviation for "COKE", the logo displayed on the first contrasting panel.

The presentation of goods within the vending machine 12 and the selection thereof for vending is accomplished by the second opaque field (control panel) 14B which includes the following components:

At the uppermost edge of the control panel 14B is a coin slot and return mechanism CS adjacent to which is a pricing label PL which displays a price for the various goods to be dispensed by the vending machine 12.

Beneath the coin slot mechanism CS is in enlarged primary product selector button BP which subtends two vertical columns of secondary product selector buttons BS1 through BS6, the secondary product selector buttons BS1–BS3 constituting one column and the secondary product selector buttons BS4–BS6 constituting a second vertical column parallel to the first.

All of the product selector buttons BP, BS1 . . . , BS6 carry various logos or symbols identifying the products corresponding thereto within the vending machine 12.

In the case of the primary product selector button BP, the logo L1 therein is identical to the logo L on the first contrasting panel 14C. This combination of the primary product logo L with its abstract suggestion of a can of the primary product beverage, in this specific example, together with the identical logo L1 on the primary product selector button BP provides a strong and effective inducement to a purchaser to purchase the primary product in the machine 12 in preference to all of the secondary product provided thereby.

This inducement to purchase is further enhanced by the combination of shapes presented by the first and second contrasting panels 14C and 14D, respectively, which superimpose an additional effect of a character which is an abbreviation for the primary product. This abbreviation for the primary product can also be an abbreviation for the manufacturer of the primary product depending upon the combined effect desired.

The control panel 14B (second opaque field) is completed by the provision of an access locking mechanism AL at the right-hand edge thereof in a relatively medial position and a coin return slot CR at the lowermost edge portion thereof.

Preferably, the selector buttons BP, BS1 . . . BS6 all are provided with translucent indicia, and are back-lighted in a suitable manner known in the art to further emphasize and present the purchaseable contents of the vending machine 12 to a potential customer. The back-lighting of the enlarged primary product selector button BP even further augments the presence of that primary product selector button and provides it with even more dominance over the subtended secondary product selector buttons BS1 . . . BS6 in the two vertical columns therebeneath.

Figure 2:
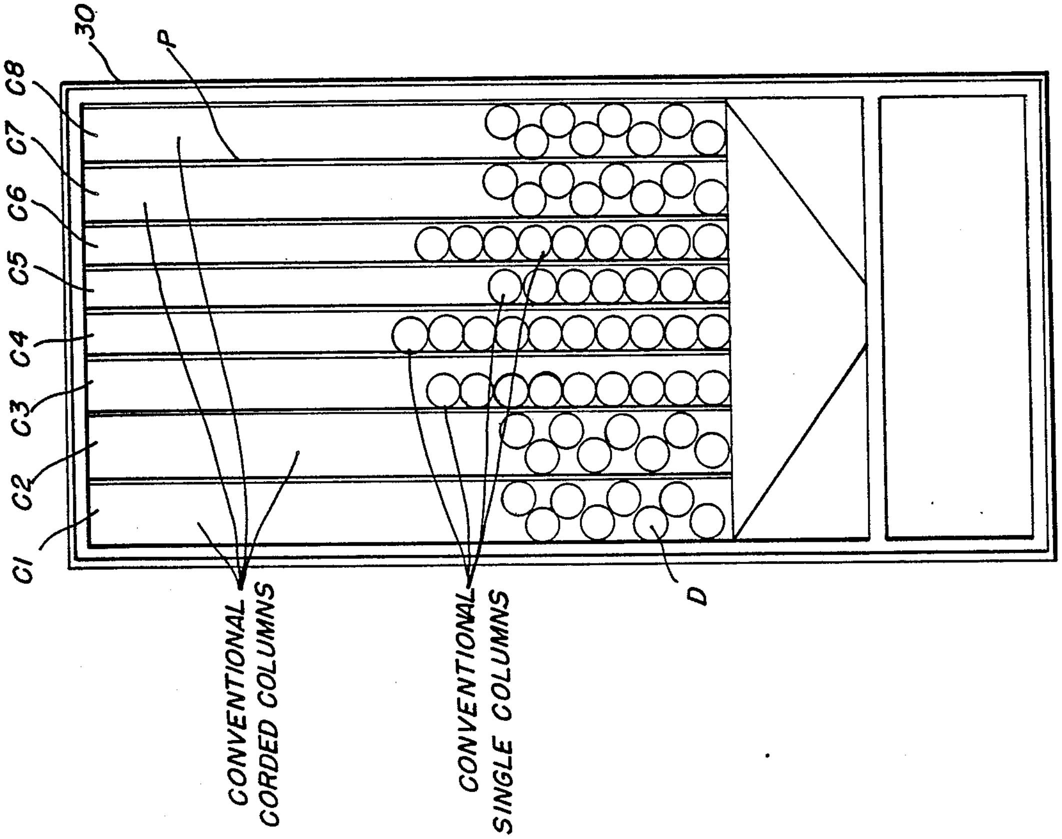
FIG. 2 is a diagrammatic illustration of prior art vend rack mechanism including only vertical storage columns disposed within a generally rectangular frame.

Referring to FIG. 2, there is illustrated a conventional vend rack including a plurality of vertical storage columns defined by vertical partitions P disposed within a substantially rectangular, box-like frame 30. Articles to be vended such as softdrink cans D are disposed in these respective vertical-storage columns, either one-, two-, or three-deep, into the plane of the paper of FIG. 2, depending on the depth of the vending machine utilized. These cans D are selectively dispensed from these columns to discharge ports such as DP in the vending machine of FIG. 1 by conventional vending mechanisms including appropriate mechanical gating means and vend motors which are actuated in response to the depression of one of the selector buttons illustrated in the vending machine of FIG. 1. The FIG. 2 vend rack includes eight vend columns, C1 to C8, which would be conventionally associated with eight selection buttons on the face of a vending machine. However, if the vending machine of FIG. 1 is utilized, including an enlarged primary product selection button BP, chutes C1 and C2 might both be operatively associated with the actuation of the enlarged primary product selection button BP.

Figure 3:
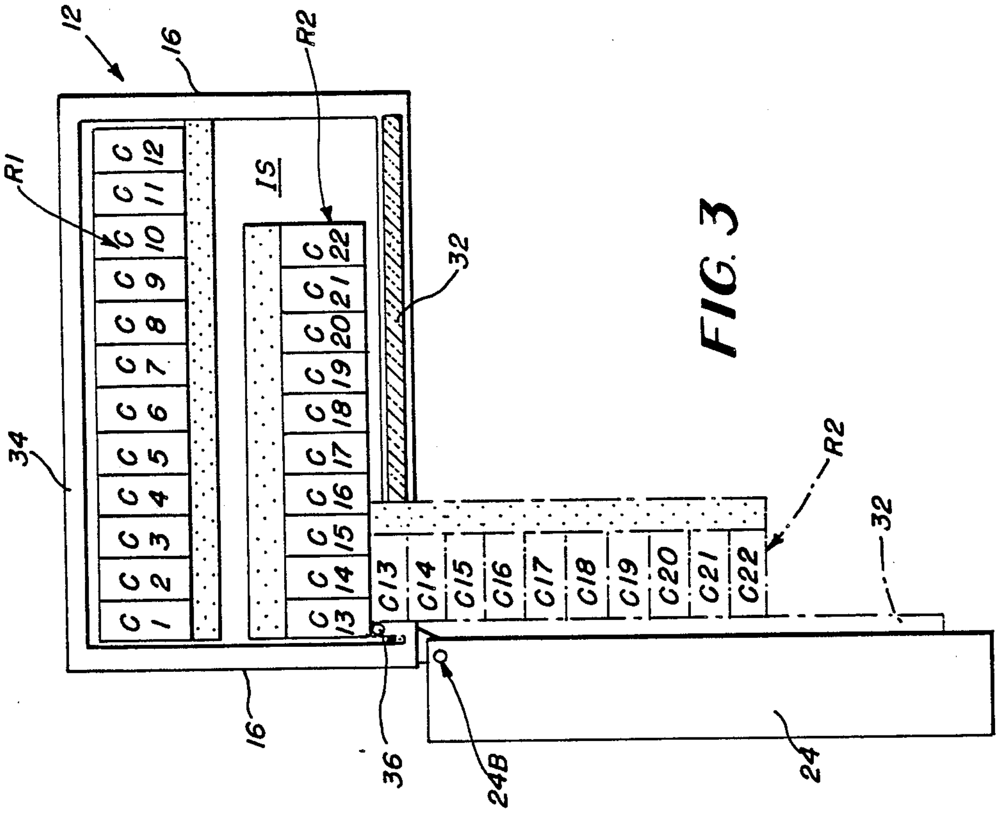
FIG. 3 is a diagrammatic top plan view of a vend rack configuration according to the present invention as would be seen with the top wall of the vending machine removed and with the door open.
Figure 5:
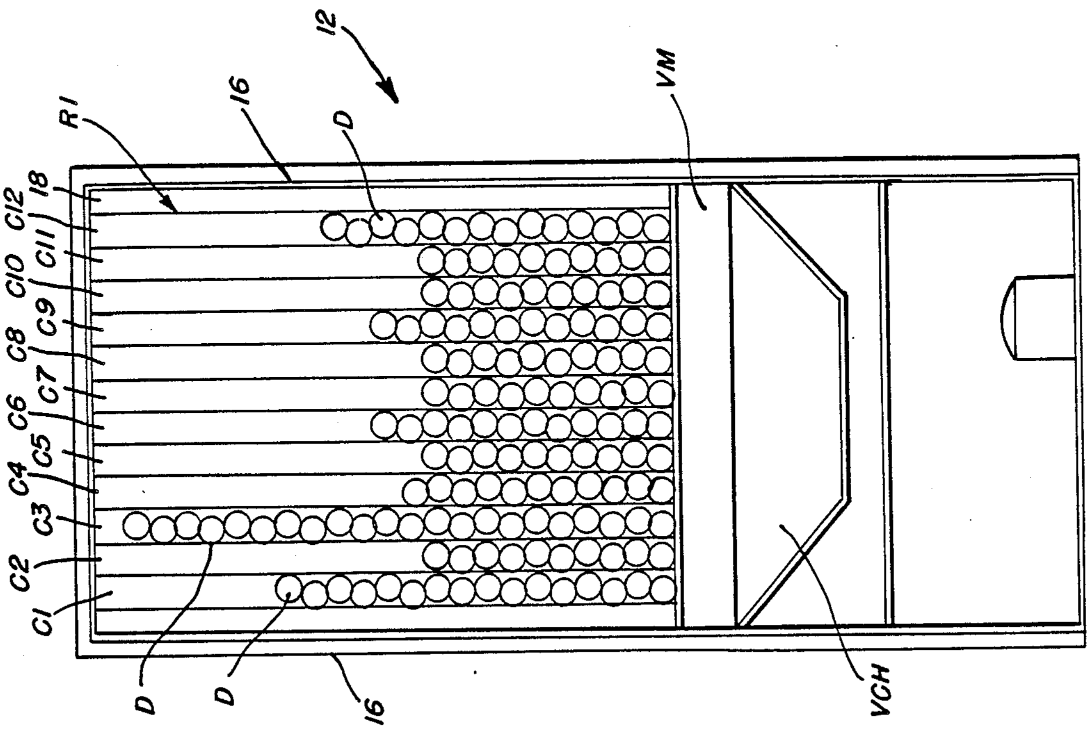
FIG. 5 is a diagrammatic cross section taken along line 5-13 5 of FIG. 4.
Figure 4:
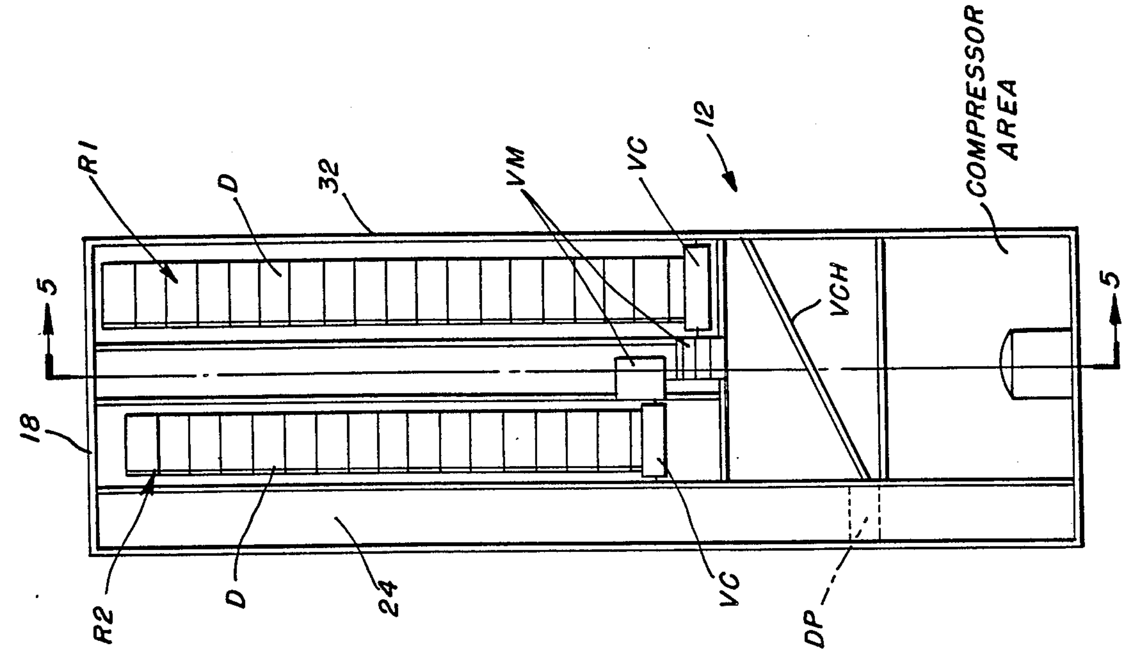
FIG. 4 is a side elevation of a vending rack configuration such as shown in FIG. 3 with a sidewall of the vending machine removed.

Referring next to FIGS. 3, 4 and 5, a vending machine 12 is shown with the door 24 swung open to reveal a substantially rectangular interior space IS defined by an insulated inner door 32, rear wall 34, sidewalls 16 and top wall 18. The inner door 32 is suitably hinged by conventional hinge means (not shown) at its left-hand extremity in the illustration of FIG. 3, to either swing with or independently of the outer door 24 as desired.

Disposed across the interior of the rear wall 34 are a plurality of single-deep vertically disposed product columns C1–C12, inclusive, which define a first row of product columns R1 in which are vertically stacked a plurality of cans D, the product to be dispensed. A second plurality of single-deep vertically disposed product columns C13–C22 inclusive, define a second row of product columns R2 mounted parallel, as a unit, to the first row R1 and having a suitable hinge structure 36 adjacent the hinge means 24B of the main door 24 to permit swinging the entire second row R2 outboard of the interior space IS from an interior position (solid lines, FIG. 3) to an outboard position (dotted lines, FIG. 3) in a similar manner to the insulated inner door 32. In the interior position shown in FIG. 3, the first and second rows of columns R1 and R2 are parallel.

Beneath each column C1–C22 are conventional vend cradles VC and adjacent thereto are vend motors VM which drive the cradles in a manner known in the art. A vending chute VCH is disposed beneath both rows R1 and R2 of columns C1–C22 to catch and direct vended product from the columns C1–C22 to the discharge port DP in the door 24 as is also well known in the art. The vend motors VM and discharge cradles VC are simply diagrammatically shown herein and may be of any suitable known design.

In the foregoing description reference to a single-deep product column refers to the capacity of that column, namely, a single vertical stack of products placed one upon the other.

By way of a glossary for further understanding of the following embodiments a single double-deep product column has a capacity for two single vertical stacks of products (e.g., the cans D placed end-to-end in two adjacent stacks). A corded double-deep product column has a capacity for two corded vertical stacks, each stack being nearly two products wide and one product deep. (See FIG. 2)

Figure 7:
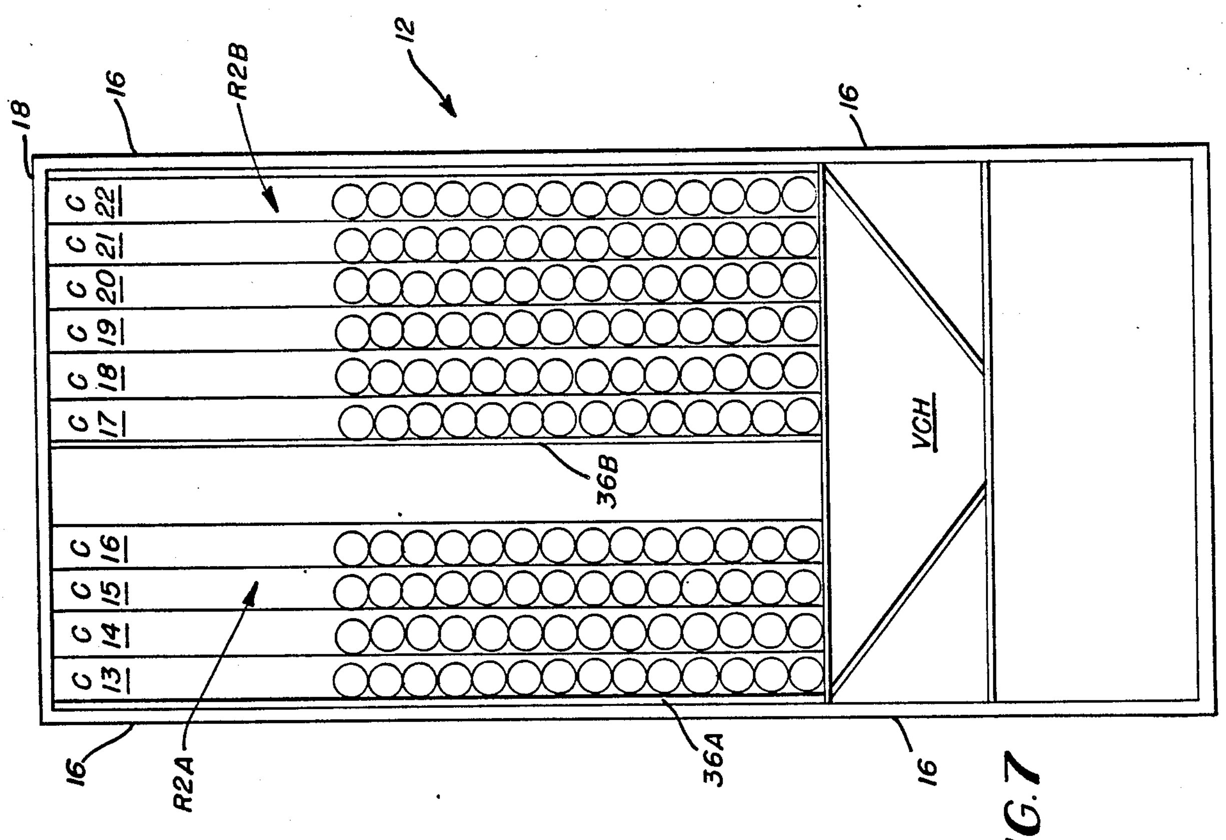
FIG. 7 is a diagrammatic cross section taken along line 7—7 of FIG. 6.
Figure 6:
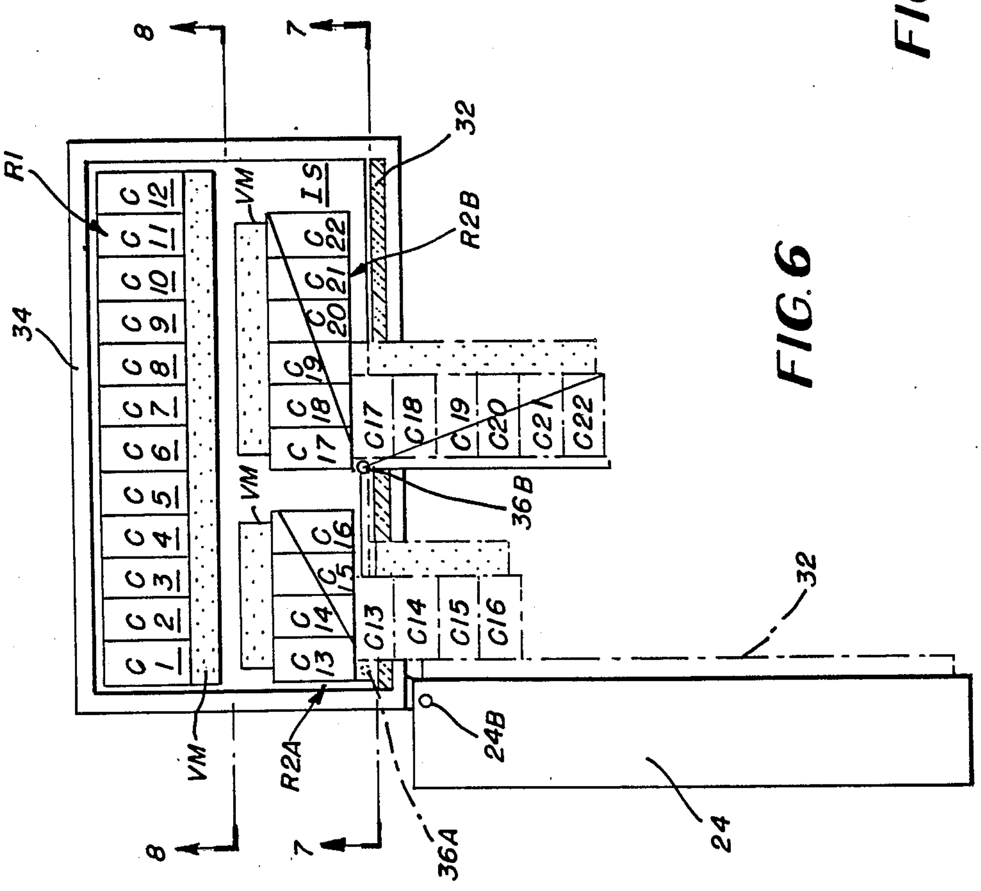
FIG. 6 is a diagrammatic top plan view of another embodiment of the vending rack configurations of the present invention illustrating the use of multiple hinged racks.
Figure 8:
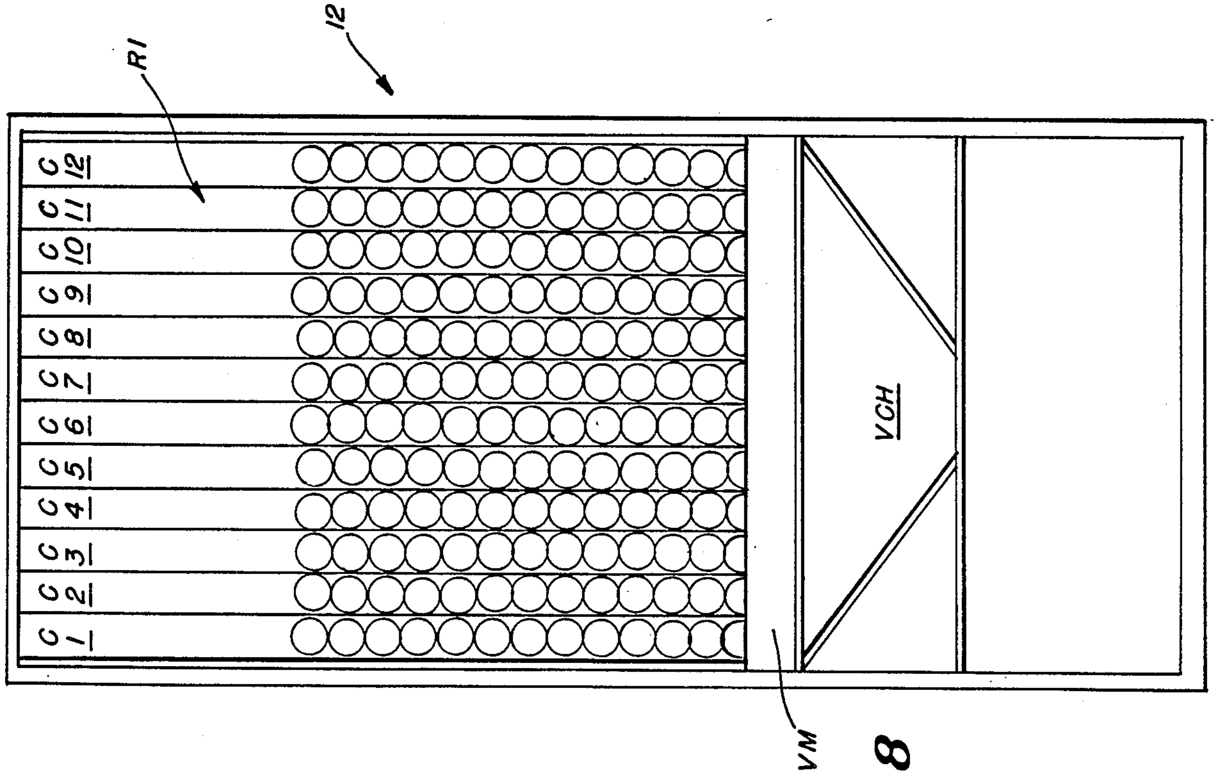
FIG. 8 is a diagrammatic cross section taken along line 8—8 of FIG. 6.

Another embodiment of the present invention using a plurality of single-deep product columns is illustrated in FIGS. 6, 7 and 8 wherein like elements to the embodiments of FIGS. 3, 4 and 5 bear like designations.

The difference in FIGS. 6, 7 and 8 is that the second row of product columns is split into two groups R2A and R2B of product columns C13–C16 and C17–C22, respectively. Both groups R2A and R2B are hinged at their left hand extremities by hinge structures 36A and 36B, respectively, to permit both groups R2A and R2B to swing outboard of the interior space IS of the vending machine 12. This provides the requisite access to all of the product columns C1–C22 for loading the product (cans D) to be dispensed.

Figure 9:
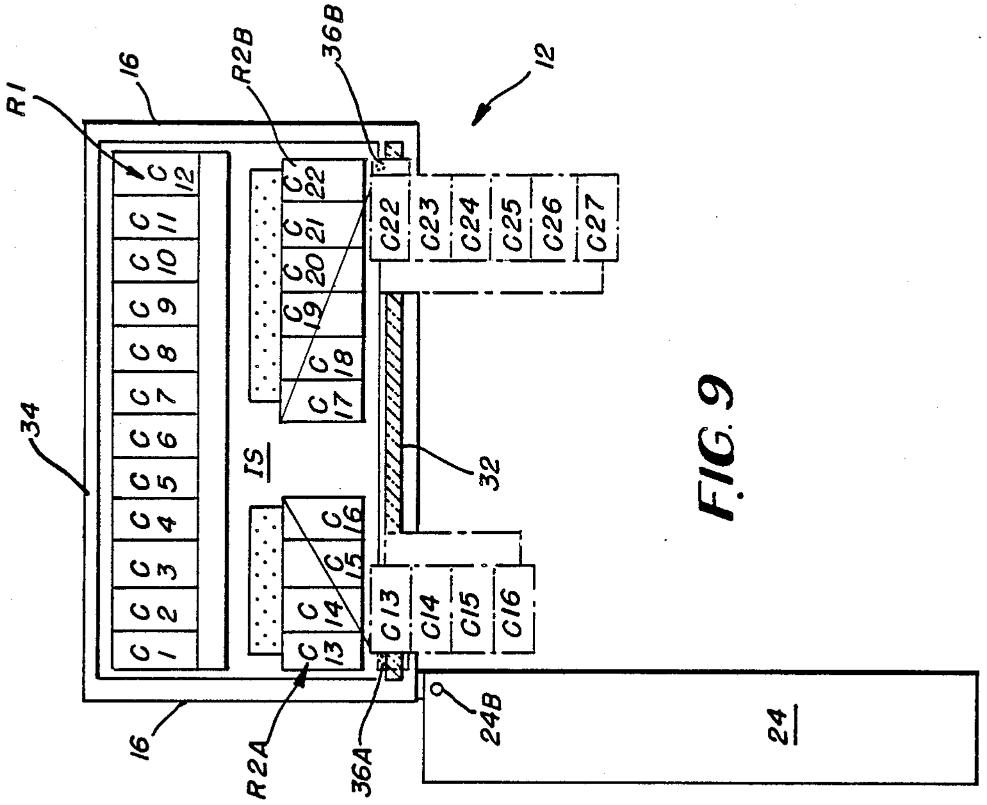
FIG. 9 is a diagrammatic top plan view of another embodiment of the vend rack configurations of the present invention utilizing multiple hinged racks.

Another embodiment the invention is illustrated in FIG. 9 which is substantially identical to FIG. 6 except that the second group R2B (columns C17–C22) of the second row R2 is pivoted at its right hand extremity by a hinge device 36B1.

Phantom line outboard positions achieved by swinging the first and second groups R2A and R2B of the second product column row R2 outboard in opposite directions about their respective hinges 36A and 36B1 are illustrated. This contrasts to the embodiment of FIGS. 6, 7 and 8 in which the first and second groups R2A and R2B of the second product column row R2 are swung outboard in the same direction (clockwise as shown in FIG. 6) about their respective hinges 36 and 36B.

Figure 10:
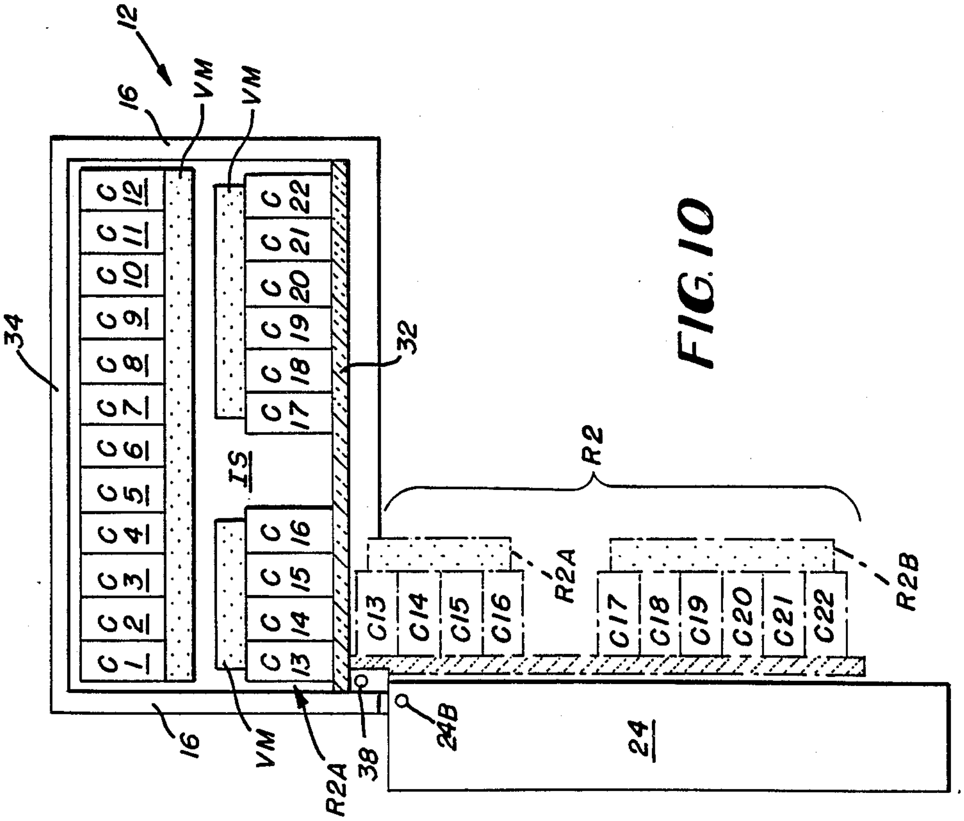
FIG. 10 is a diagrammatic top plan view of another embodiment of the vend rack configurations of the present invention utilizing door mounted vend racks.

Referring next to FIG. 10, wherein like elements to FIGS. 6, 7, 8 and 9 are indicated by like designations, the first and second row of product columns R2 are mounted on the interior of the insulated inner door 32. The first and second groups R2A and R2B thus swing outboard of the interior space IS of the vending machine 12 with the entire inner door 32 about the hinge structure 38 of the latter. This outboard position is shown in phantom lines.

Another embodiment of the present invention which provides an array of corded double-deep product columns, single double-deep product columns and single-deep product columns will now be described with reference to FIGS. 11 and 12. Like elements to the previous embodiments will be designated by like numerals except that the product columns have been renumbered to avoid confusion.

Figure 11:
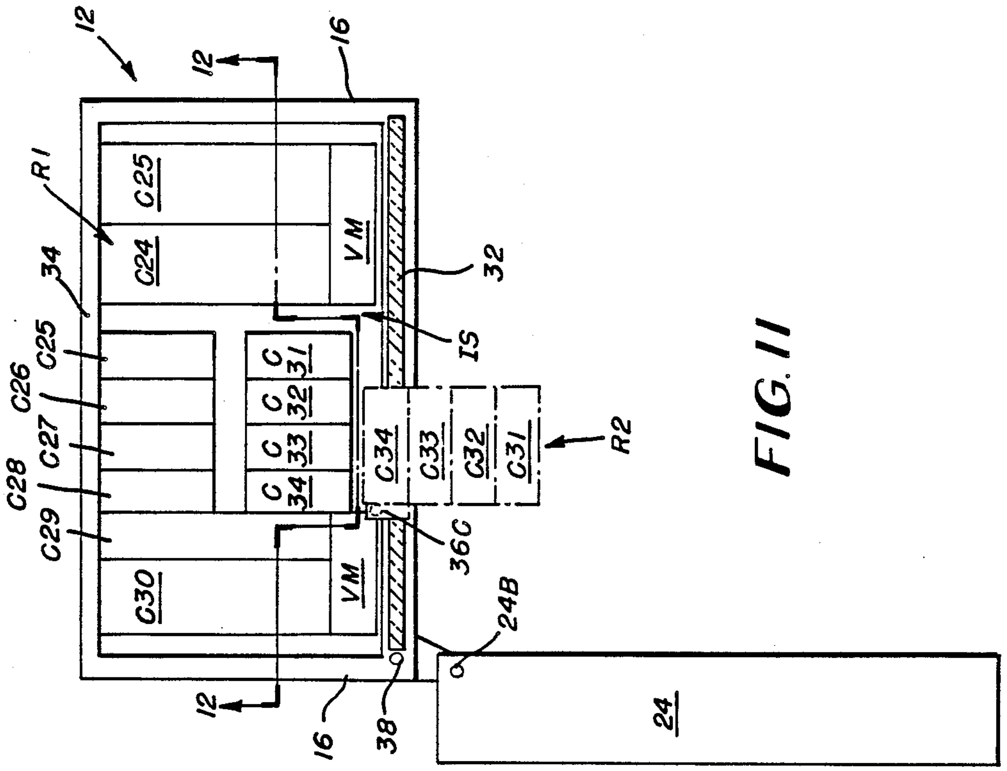
FIG. 11 is a diagrammatic top plan view of yet another embodiment of the present invention illustrating a combination of double- and single-deep columns, both fixed and hinged.

The first row R1 of product columns includes columns C23–C30, inclusive, which are of the following types, proceeding from right to left across FIG. 11:

C23, C24—corded double-deep product columns;

C25–C28—single-deep product columns;

C29—single double-deep product column; and

C30—corded-double-deep product column.

The single-deep product columns C25–C28 in the first row R1 are fixed at the rear wall 34 of the vending machine 12 in the interior space IS such that an indentation is provided between the single double-deep product column C29 and corded double-deep product column C24 to receive a second row R2 of single-deep product columns C31–C34, inclusive, coextensively disposed with the adjacent single deep product columns C25–C28 in the first row R1. The second row R2 is pivoted on a hinge 36C at its left hand extremity to swing to the outboard phantom line position shown.

Figure 12:
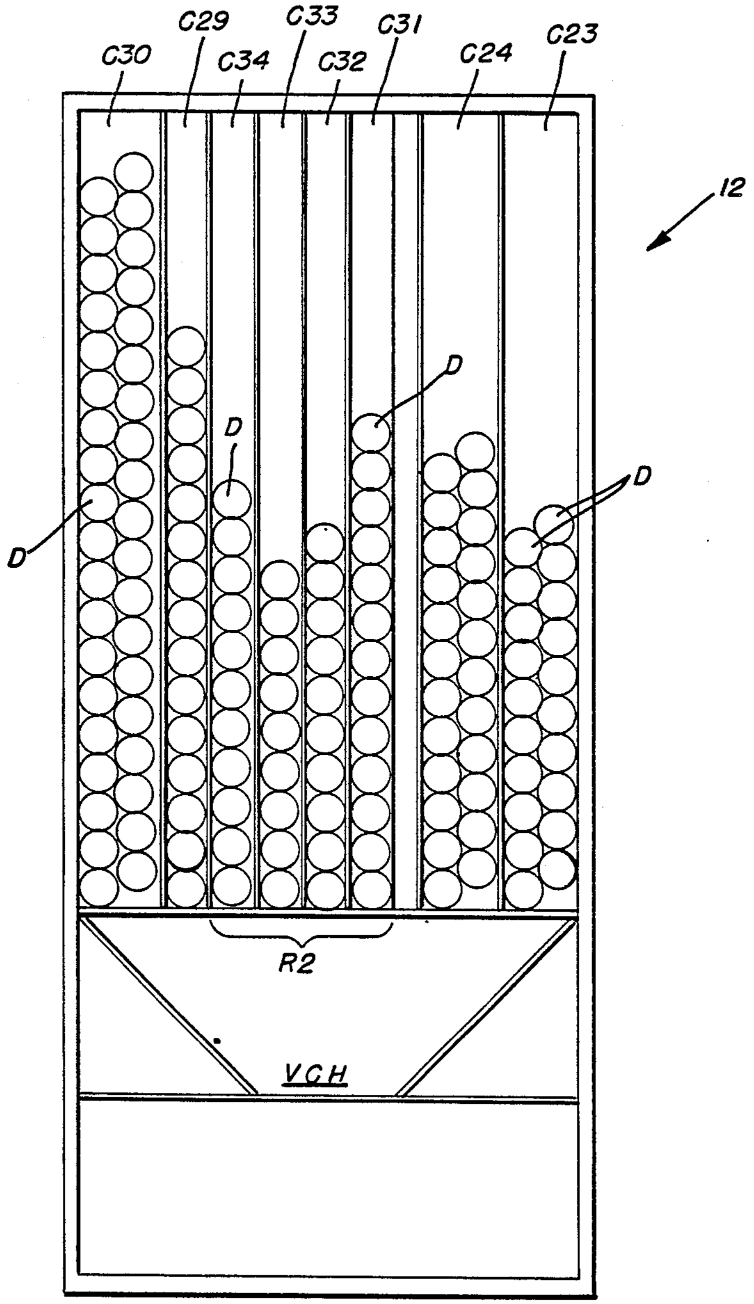
FIG. 12 is a diagrammatic cross section taken along line 12—12 of FIG. 11.

To further illustrate the configuration of a corded double-deep product column, attention is directed to columns C23, C24 and C30 as illustrated in front elevation in FIG. 12 as contrasted to the elevation of column C29 in that same Figure of a single double-deep product column.

The entire first row R1 of product columns is fixed within the interior space IS of the vending machine 12.

The second row R2 may be hinged within the interior space IS to the vend rack assembly or alternatively, may be mounted on the interior of the inner door 32 to effect its outboard positioning.

DESCRIPTION OF OPERATION

The various product columns of the present invention are controlled by the primary selection button BP and secondary selection buttons BS1-BS6 in various combinations of one or more columns per button so that the space-to-sales versatility provided by the present invention can be fully realized.

Therefore, depending on the relative sales anticipated for the several products in a given embodiment, the primary selection button BP can control a combination of single-deep columns in the embodiments of FIGS. 3 through 10 and various combinations of corded double-deep, single double-deep and/or single-deep columns in the embodiments of FIGS. 11 and 12. Similar versatility is afforded the secondary selection buttons BS1-BS6 to adopt product space to the sales needs of the marketplace. Control of a plurality of vend motors and vending cradles at respective columns in a group with single selection buttons can, therefore, by the correct electrical interconnections, control a wide variety of product space configurations for the purpose intended.

It should be understood that the particular vending format of the vending machine including the primary selection button BP, etc., is only exemplary and that any vending format for multiple products is contemplated for use with the present invention. Furthermore, the column configurations used may also include serpentine dispensing paths rather than the rectilinear paths illustrated herein.

Accordingly, it can be seen that enhanced selectivity can be achieved in dispensing products within the vending machine of the present invention due to the large variety of column and stacking arrangements possible within the interior storage space of the machine.

It should be further understood that other variations of the vend rack assembly described herein may be made, as would occur to one of ordinary skill in the art without departing from the general spirit and scope of the present invention.

What is claimed is:

1. A vend rack assembly for delivering vendable cylindrical products to discharge port means in the face of a vending machine comprising:

a plurality of vertical columns disposed side-by-side in a parallel relationship behind said face of said vending machine, the bottom of each of said columns communicating with said discharge port means, said columns including means for supporting products in stacks therein and being arranged in groups to provide space for respective products commensurate with anticipated sales of such products, some of said columns being fixed within said vending machine and certain of said columns indicating means for mounting said certain columns for at least partial removal thereof from the interior of said vending machine, said columns including at least tow different product storage configurations and capacities, to provide access to all of said columns for loading the same with said products and to maximize the number of groups of said columns within a given interior space of said vending machine;

wherein said columns are collectively contained side-by-side in at least first and second rows within a substantially rectangular area as viewed from the front of said vending machine, wherein said second row is parallel to said first row and said first row is fixed within said vending machine and said second row includes mounting means for said columns in said second row to permit said second row of columns to move outward from the interior of said vending machine to facilitate loading of products therein, said mounting means includes a hinged pivot means permitting said second row to swing away from said first row;

an interior rear wall opposite said vending machine face; and a pair of sidewalls substantially extending from said rear wall to said face;

wherein said first row comprises a combination of vertically disposed corded double-deep product columns, single double-deep product columns and single-deep product columns disposed across said interior rear wall, and wherein said second row comprises a plurality of vertically disposed single-deep product columns in said mounting means adjacent the interior of said vending machine face.

2. The vend rack according to claim 1, wherein said pivot means is at one end of said second row.

3. The vend rack according to claim 1, wherein said vending machine includes an outer door at said vending machine face; and wherein said pivot means is mounted on the interior of said vending machine adjacent said outer door.

4. The vend rack according to claim 1, wherein said mounting means includes door means separating said vend rack assembly from said vending machine face and;

wherein said pivot means comprises hinges for said door means.

5. The vend rack according to claim 1, wherein in said first row, said single-deep product columns are arranged in a group across said interior rear wall; and wherein said second row in said mounting means is coextensive with said group of single-deep product columns.

6. The vend rack according to claim 5, wherein, in said first row, said double-deep product columns are disposed at said sidewalls and said group of single-deep product columns is disposed between groups of said double-deep product columns.

7. A vending machine for storing and delivering a plurality of vendable cylindrical products to discharge port means in the face thereof, said vendable products including primary high demand products and secondary lower demand products, said vending machine comprising:

(a) a product selection panel including primary product selector means and secondary product selector means for selecting said primary and secondary products, respectively;

(b) a vend rack assembly for delivering the vendable products to the discharge port means in the face of a vending machine including, a plurality of vertical columns disposed side-by-side in a parallel relationship behind said face of said vending machine, the bottom of each of said column portions communicating with said discharge port means, said columns including means for supporting products in stacks therein and being arranged in groups to provide space for respective products commensurate with anticipated sales of such products, some of said columns being fixed within said vending machine and certain of said columns including means for mounting said certain columns for at least partial removal thereof form the interior of said vending machine to provide access to all of said columns for loading the same with said products and maximizing the number of groups of said columns within a given interior space of said vending machine, wherein said columns are collectively contained side-by-side in at least first and second rows within a substantially rectangular area as viewed from the front of said vending machine, and wherein said second row is parallel to said first row and said first row is fixed within said vending machine and said second row includes mounting means for said columns in said second row to permit said second row of columns to move outward from the interior of said vending machine to facilitate loading of products therein, said mounting means includes a hinged pivot means permitting said second row to swing away from said first row;

(c) vend initiation means responsive to said selector means for releasing vendable products from the bottom of the vertical columns, at least one vend initiation means being associated with each column;

(d) means operatively connecting said primary product selector means with vend initiation means of selected ones of said columns and said secondary product selector means with other ones of said columns;

whereby primary, high demand products may be stored in said selected ones of said columns and said secondary, lower demand products may be stored in said other means of said columns; and (e) an interior rear wall opposite said vending machine face and a pair of sidewalls substantially extending from said rear wall to said face, wherein said first row comprises a combination of vertically disposed corded double-deep product columns, single double-deep product columns and single-deep product columns disposed across said interior rear wall;

said second row comprises a plurality of vertically disposed single-deep product columns in said mounting means adjacent the interior of said vending machine face.

8. The vending machine according to claim 7, wherein said pivot means is at one end of said second row.

9. The vending machine according to claim 7, wherein said vending machine includes an outer door at said vending machine face; and wherein said pivot means is mounted on the interior of said vending machine adjacent said outer door.

10. The vending machine according to claim 7, wherein said mounting means includes door means separating said vend rack assembly from said vending machine face and;

wherein said pivot means comprises hinges for said door means. pg,31

11. The vending machine according to claim 7, wherein in said first row, said single-deep product columns are arranged in a group across said interior rear wall; and wherein said second row in said mounting means is coextensive with said group of single-deep product columns.

12. The vending machine according to claim 11, wherein, in said first row, said double-deep product columns are disposed at said sidewalls and said group of single-deep product columns is disposed between groups of said double-deep product columns.

* * * * *